Sept. 1, 1925.
J. W. WHITE
1,552,369
INCLOSED ARC WELDING DEVICE
Filed Jan. 5, 1921
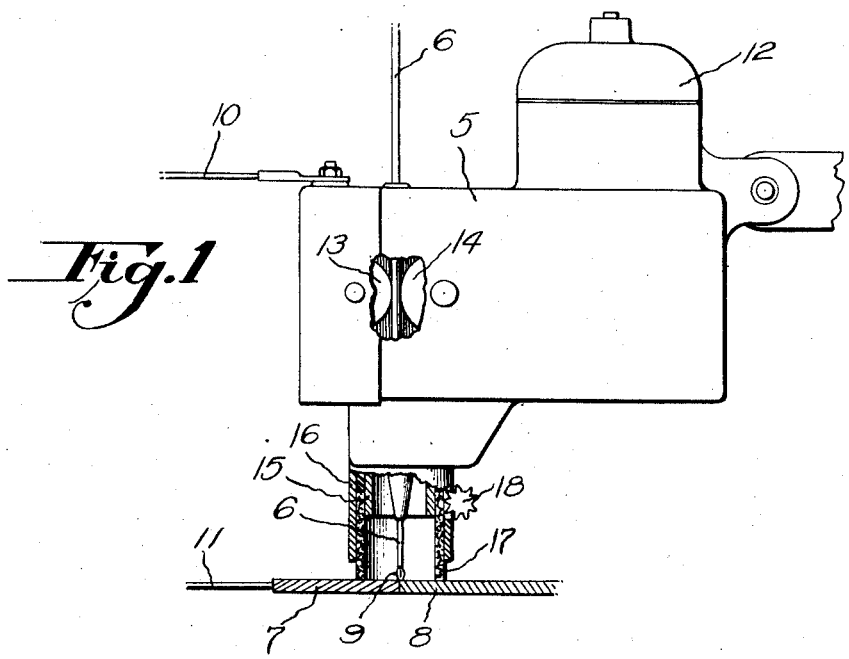
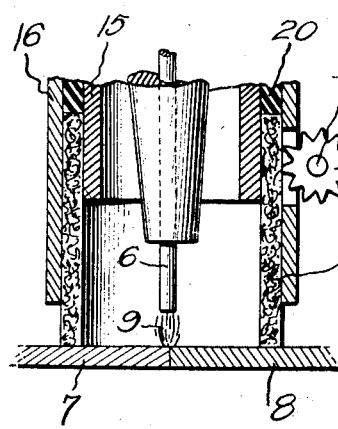
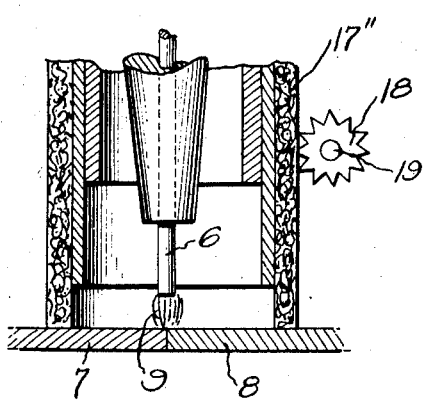
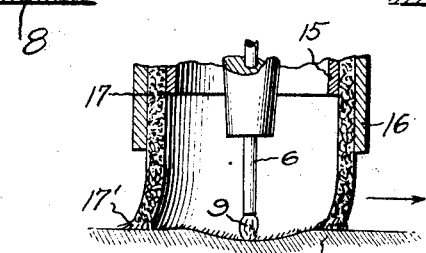
Inventor
John W. White
By his Attorneys Patented Sept. 1, 1925.

1,552,369

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

INCLOSED-ARC WELDING DEVICE.

Application filed January 5, 1921. Serial No. 435,152.

*To all whom it may concern:*

Be it known that I, JOHN W. WHITE, a citizen of the United States, and a resident of Detroit, county of Wayne, and State of Michigan, have invented certain new and useful Improvements in Inclosed-Arc Welding Devices, of which the following is a full, clear, concise, and exact description, such as will enable others skilled in the art to which the invention relates to make and use the same, reference being made therein to the accompanying drawings, which form a part of this specification.

The invention relates to the art of working metals by means of an electric arc or analogous uses of the arc and has for its primary object the provision of means whereby the arc may be made more stable and more easily controlled and whereby the operations to be performed may be facilitated and the results rendered more uniform and of higher quality than has been hitherto obtainable.

In ordinary industrial processes, in which the electric arc is now employed, such for example, as electric welding, it is customary to form and manipulate the arc in the open air. This renders necessary the interposition of a screen of colored glass or other suitable material between the arc and the eyes of the workmen, owing to the intense light emitted by the arc. Furthermore the exposure of the surfaces under treatment to free circulation of air causes rapid cooling as well as rapid oxidation of the fused or highly heated materials. The extremely high temperature of the arc in the presence of free air is also conductive to the formation of hard slaggy substances which mingle with the metal being fused or deposited. As a result therefore it has been found extremely difficult to obtain a soft, well-bonded weld or a uniform deposition of metal.

My invention aims to eliminate the above-mentioned objections to the electric arc processes as now practiced, and to that end it contemplates the exclusion of the air from about the arc, to such extent as may be practicable, by providing a sealing device whereby the arc and adjacent portions of material under treatment may be partially or entirely inclosed.

In the accompanying drawings in which is illustrated one embodiment of my invention Fig. 1 is a side elevation partially in section of an automatic arc welding mechanism with an arc inclosing device in operative relation thereto.

Fig. 2 is a sectional view showing the inclosing device on an enlarged scale, Fig. 3 is a view similar to Fig. 2 but showing a slightly modified form, and Fig. 4 is a view similar to Fig. 2 but showing the operation of the device in moving over an uneven surface.

It will be understood that my invention will be of particular utility in connection with some form of device whereby the arc may be automatically controlled so as not to require constant attention on the part of the workman. Where a carbon or like pencil is employed it may be possible to maintain an arc of relatively uniform length for a length of time sufficient for the purposes of the apparatus without the provision of automatic feeding means for advancing the pencil. However, where a metallic pencil is employed as one electrode it is of course necessary to provide for feeding the pencil toward the work at a rate corresponding to that at which it is fused under the influence of the arc. Accordingly I have illustrated my invention in connection with a device whereby a metallic electrode may be supplied at the desired rate, preferably automatically.

In the form illustrated in Fig. 1, 5 indicates an automatic welding head adapted to feed a pencil or electrode 6 toward the work, which latter may comprise plates 7, 8, at whose joint the arc 9 is to be drawn. A source of welding current is connected to the welding head and to the work respectively as by leads 10, 11. A motor 12 is arranged to actuate feed wheels 13, 14, by any suitable gearing connections and the motor or connections may be controlled in any desired or usual manner to regulate the feed of the electrode material 6.

Secured to the welding head in any convenient way and surrounding the electrode are arranged two guard sleeves 15, 16, preferably of metal or other rigid and heat-resistant material. Between these sleeves is mounted a sleeve 17, preferably flexible, and which may be of asbestos or like material. This sleeve, which constitutes the principal inclosing an air-excluding element, is preferably opaque or at least of sufficient opacity or with such light-selective properties as to prevent undesirable transmission of light. Flexibility is desirable inasmuch as it may be necessary for the sleeve to move over and in contact with surfaces of some irregularity. Heat-resistant and electric insulating properties are also desirable, as will be obvious.

In Fig. 4 an irregular surface is represented at 8′, and the sleeve 17 is shown as being flexed somewhat as a result of its being drawn over the surface in the direction of the arrow. The lower edge of the sleeve, as indicated at 17′, may become frayed at its edge in use, or may be so formed preliminarily as to have increased flexibility adjacent its edge to operate in a manner similar to that in which a frayed edge will operate, in order to facilitate passage over irregularities in surfaces and maintenance of contact therewith.

In order to provide for movement of the inclosing member toward and away from the work a feed device, shown as a toothed wheel 18 mounted upon an actuating shaft 19, is arranged in position to engage the element 17 and cause the same to travel in either direction as necessary. Any suitable actuating means, manual or mechanical, may be provided to cause the rotation of the feed device.

Instead of mounting the inclosing element or sleeve 17 between two guard sleeves as shown in Fig. 2 it may be mounted exteriorly of such sleeves as shown at 17″ in Fig. 3.

An insulating sleeve or bushing 20 may be provided to insure electrical separation between the guard sleeve 15, 16 and to support the latter.

Upon the drawing of the arc, or preferably preliminary thereto, the casing element or sleeve will be so adjusted as to inclose as far as practicable the space immediately surrounding the point where the arc is to operate. The formation of air currents is thus prevented and the arc is rendered much more stable. This effect has been found to be of especial advantage in connection with automatic electrode feeding devices since the operation of the arc becomes more constant and reliable. Furthermore the progress of oxidation is made much slower even without the introduction of any inert gas, owing to the relatively small amount of air which has access to the arc. The amount of oxygen in the inclosed space will of course rapidly decrease and the heating effect or expansion and evolution of gases will serve to displace the air and cause outward pressure, so that the accuracy of the air seal is not so material. The protection of the arc and metal from external cooling effects also results in a more rapid development of heat and resultant welding or deposition of metal with a given expenditure of electrical energy.

Finally, the production of slag and like silicious or other impurities is to a large extent prevented, and the metal deposited has proved to be of better quality and much less porous than was obtained with the open arc.

It will be understood that the generic idea of inclosing the arc for the purpose of effecting the speed, convenience, and quality of the work in connection with metal-working operations may be readily embodied in widely diverse forms of mechanical construction and I do not desire to be in any way limited to the specific structure herein disclosed.

I claim:

1. In electric arc metal-working apparatus the combination with means for producing an electric arc between an electrode and a work-piece, of means for inclosing the arc comprising a flexible sleeve surrounding the arc and adapted to contact with the work-piece, said sleeve being spaced from the arc a sufficient distance to prevent fusing of the material thereof by the heat of the arc.

2. In electric arc metal-working apparatus the combination with means for producing an electric arc of means for preventing free access of air to said arc comprising a flexible casing and means for moving said casing either toward or from the work.

3. In electric arc welding apparatus the combination with a device adapted to feed metallic electrode material toward a work piece of means for inclosing the arc comprising a support and a flexible sleeve mounted upon said support and movable toward and from the work piece.

4. In electric arc metal-working apparatus the combination with means for supporting an electrode and moving the same toward the work automatically at the rate necessary to maintain a uniform arc of opaque means substantially inclosing the arc and adapted to engage the surface of the work around the arc.

5. In electric arc metal-working apparatus the combination with means for supporting an electrode and for bringing the same into proper relationship with the work to produce an arc of a flexible sleeve of heat-resistant insulating material surrounding the arc and spaced therefrom and adapted to contact with the surface of the work around the arc and means for positioning the sleeve relatively to the work.

In testimony whereof I affix my signature.

JOHN W. WHITE.